US006771841B1

(12) United States Patent
O'Rourke et al.

(10) Patent No.: US 6,771,841 B1
(45) Date of Patent: Aug. 3, 2004

(54) DETERMINING A BOUNDING SHAPE FOR A COLLECTION OF POINTS

(75) Inventors: Thomas P. O'Rourke, Portland, OR (US); Jason R. Plumb, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/474,648

(22) Filed: Dec. 29, 1999

(51) Int. Cl.[7] .......................... G06K 4/36; G06T 17/00; G06T 15/40
(52) U.S. Cl. ...................... 382/288; 345/420; 345/421; 345/422
(58) Field of Search .................................. 382/288, 167; 345/426, 648, 422, 505, 592, 520, 427, 421; 700/182; 707/2, 5

(56) References Cited

U.S. PATENT DOCUMENTS

| | | | | |
|---|---|---|---|---|
| 4,885,688 A | * | 12/1989 | Crawford | 345/427 |
| 5,357,600 A | * | 10/1994 | Shirman et al. | 345/520 |
| 5,363,475 A | * | 11/1994 | Baker et al. | 345/422 |
| 5,757,321 A | * | 5/1998 | Billyard | 345/434 |
| 5,856,924 A | * | 1/1999 | Brost et al. | 700/182 |
| 6,016,152 A | * | 1/2000 | Dickie | 345/436 |
| 6,016,487 A | * | 1/2000 | Rioux et al. | 707/2 |
| 6,054,991 A | * | 4/2000 | Crane et al. | 345/420 |
| 6,263,334 B1 | * | 7/2001 | Fayyad et al. | 707/5 |
| 6,373,489 B1 | * | 4/2002 | Lu et al. | 345/428 |
| 6,556,206 B1 | * | 4/2003 | Benson et al. | 345/473 |
| 6,571,012 B1 | * | 5/2003 | Pettigrew | 382/167 |
| 6,573,895 B1 | * | 6/2003 | Carter et al. | 345/441 |
| 6,618,047 B1 | * | 9/2003 | Lim | 345/421 |

OTHER PUBLICATIONS

Iones et al., "On Optimality of OBBs for Visibility Tests for Frustum Culling, Ray Shooting and Collision Detection", IEEE Proceedings on Computer Graphics International, Jun. 1998, pps. 256–263.*

Ritter Jack, "An Efficient Bounding Sphere", Graphics Gems, Andrew S. Glassner (ed.), Academic Press, Inc., Boston, 1990, pp. 301–303, 723–725.

* cited by examiner

*Primary Examiner*—Anh Hong Do
(74) *Attorney, Agent, or Firm*—Fish & Richardson P.C.

(57) ABSTRACT

A multi-dimensional bounding sphere is determined for a collection of points by determining a multi-dimensional bounding box that encompasses all of the points, determining the center of the bounding sphere from the center of the bounding box, and determining the radius of the bounding sphere as the distance from the center of the bounding sphere to a location not closer to the center of the bounding sphere than any of the points in the collection of points.

40 Claims, 4 Drawing Sheets

DETERMINING A BOUNDING SHAPE FOR A COLLECTION OF POINTS

BACKGROUND

This invention relates to determining a bounding shape for a collection of points.

One way to accelerate the drawing of graphics is to avoid processing objects that are not visible in a frame, e.g., objects that are "off camera." One way to avoid processing off camera objects is to calculate a bounding shape that encompasses all of the points on a given object and then to use the bounding shape to test whether to exclude the entire object from processing. In a multi-dimensional graphics system, e.g., three-dimensional ("3-D"), the collection of points, e.g., (x,y,z) coordinates, on an object in a frame is the vertex pool for each object's bounding shape.

Bounding shapes can be useful in a variety of processing scenarios. For scene management, off camera objects may not need updating in every new frame. For example, a wheel of a car may be off camera in a particular frame. Processing the car but not the hidden (off camera) wheel decreases the amount of time and computation that would be necessary if the wheel were processed and then later discarded before the frame is finally rendered. An object such as the wheel will be off camera if its bounding shape is off camera. The test to determine if the bounding shape is off camera is much simpler than the test to determine if all points of the object are off camera.

For run-time animation, intersections of objects may need to be determined. For example, part of a wheel of a car may be obscured by a rock in the road. Refraining from processing the off camera portions of the wheel decreases the amount of time and computation that would be necessary if the entire wheel were processed and later partially obscured by the rock. If the bounding shapes of two objects such as the wheel and the rock do not intersect, then the objects do not intersect. Testing for the intersection of two bounding shapes is much simpler than testing for the intersection of two complicated objects.

In ray tracing rendering methods, the intersection of a ray with an object needs to be determined. A quick test to determine if the ray intersects a bounding shape of the object can be used to avoid work if there is no intersection. Any intersection points may give an initial range for some ray tracing methods.

One known method of calculating bounding spheres is described in Jack Ritter, "An Efficient Bounding Sphere," in GRAPHICS GEMS, Andrew S. Glassner (ed.), Academic Press, Inc., Boston, 1990, pp. 301–03, 723–25. As shown in FIG. 1, the Ritter method finds the location and size of a bounding circle 10, e.g., a 3-D sphere, for a collection of points 12 by the following steps. First, the method finds the points that have the minimum and maximum positions along each dimension, points 14a and 14b (x dimension) and 16a and 16b (y dimension). The method then finds the dimension that has the largest distance between its minimum and maximum points 14 or 16. Here it is the y dimension between points 16a and 16b. The method next calculates an initial radius 18 of an initial bounding sphere 20 as one half the distance between the minimum and maximum points 16a and 16b. The method also calculates an initial center 22 of the initial bounding sphere 20 as the average of the minimum and maximum points 16a and 16b.

Now, to see if the initial bounding sphere 20 encloses all points in the collection 12, the method checks each point in the collection 12 to see if the distance between it and the initial center 22 is greater than the initial radius 18. For the first point in the collection 12 that is outside the initial sphere 20, the initial radius 18 and initial center 22 change to an intermediate radius 24 and an intermediate center 26 to define an intermediate bounding sphere 28. All subsequent points are evaluated using the intermediate values 24 and 26, which can change in the same way as the initial values 18 and 22. Checking all of the points in the collection in this manner requires a number of calculations. The more points in the collection 12, the higher the number of required calculations. Once all points in the collection 12 have been checked against the appropriate sphere 20 or 28, the final bounding sphere 10 is defined by the appropriate radius 18 or 24 and center 22 or 26.

SUMMARY

In general, in one aspect, the invention features determining a multi-dimensional bounding sphere for a collection of points by determining a multi-dimensional bounding box that encompasses all of the points, determining the center of the bounding sphere from the center of the bounding box, and determining the radius of the bounding sphere as the distance from the center of the bounding sphere to a location not closer to the center of the bounding sphere than any of the points in the collection of points.

In another aspect, the invention features an apparatus for determining a three-dimensional bounding sphere for a collection of points including a storage unit to store the collection of points and a processor. The processor is configured to determine a three-dimensional bounding box that encompasses all of the points, to determine the center of the bounding sphere from the center of the bounding box, and to determine the radius of the bounding sphere as the distance from the center of the bounding sphere to a location not closer to the center of the bounding sphere than any of the points in the collection of points.

In another aspect, the invention features determining a bounding sphere for a collection of points by determining a bounding box that encompasses all of the points, determining a center of the bounding box, determining the one of the points that is farthest away from the center, and determining a radius of the bounding sphere as the distance from the center to the one of the points that is farthest away from the center.

In another aspect, the invention features determining a bounding sphere for a collection of points by determining a bounding box that encompasses all of the points, determining a center of the bounding box, and determining a radius of the bounding sphere as the distance from the center to a corner of the bounding box.

Other advantages and features will become apparent from the following description and from the claims.

DESCRIPTION

Figure 2:
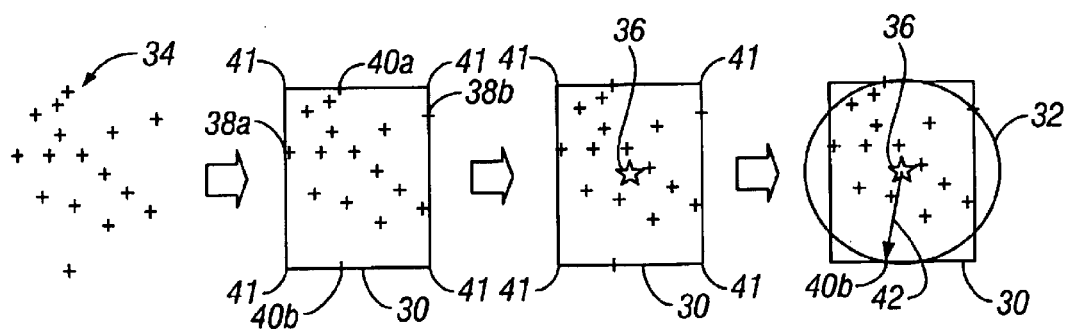
FIG. 2 is a diagram of a method of calculating a bounding shape in accordance with an implementation of the invention.

In a specific embodiment of the invention shown in FIG. 2, a bounding box 30 is determined as the basis for determining a bounding sphere 32 for a collection of points 34. The sphere 32 is pictured as a two-dimensional circle, though it could be in any dimension. The box 30 acts as a preliminary bounding shape for the collection of points 34. The final bounding shape, the sphere 32, uses a center 36 of the box 30 as its own center 36 and a point in the collection of points 34 to define its radius 42. The sphere 32 is the shape used later in determining if the object represented by the collection of points 34 needs further processing or not. FIG. 2 illustrates a two-dimensional example, but the method also works in higher dimensions (including three dimensions).

Figure 3:
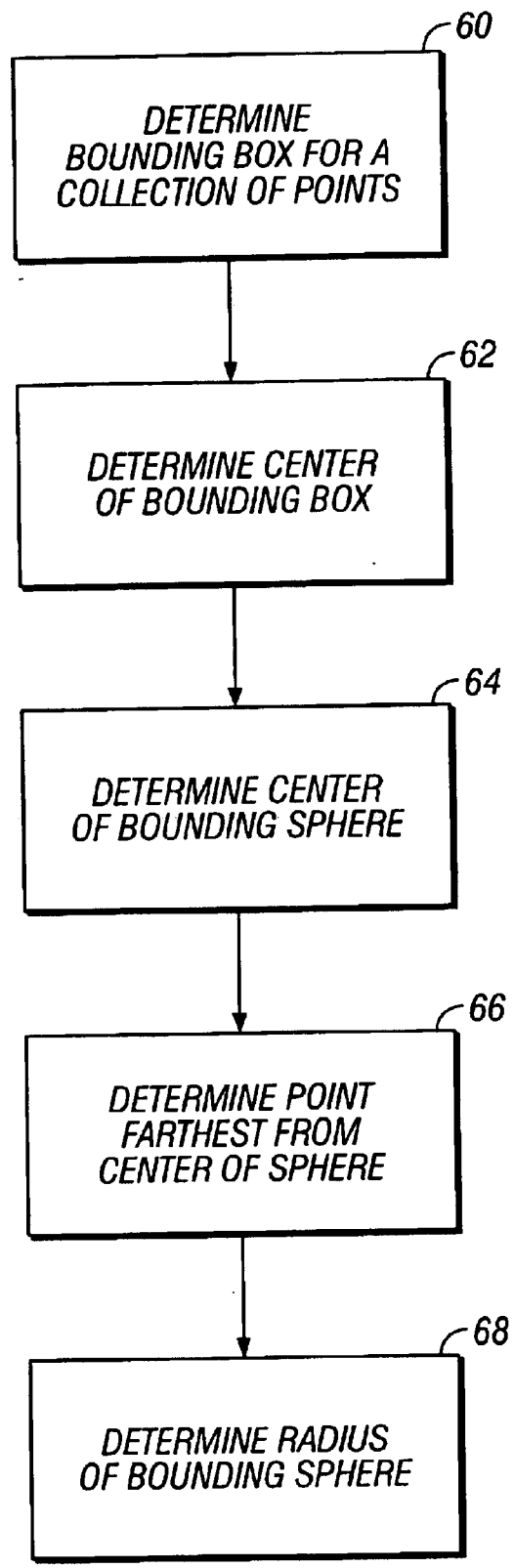
FIG. 3 is a block diagram showing a method of calculating a bounding shape in accordance with an implementation of the invention.

Also referring to the flowchart of FIG. 3, the method determines 60 the bounding box 30 that surrounds the collection of points 34. The points with the highest and lowest coordinate values in each dimension define the perimeter of the box 30. Here the defining points are points 38a and 38b (x dimension) and 40a and 40b (y dimension). The method then calculates 62 the center 36 of the box 30, e.g., by calculating 62 the average of the corners 41 of the box 30. This center 36 is also taken 64 as the center 36 of the bounding sphere 32. The method determines 66 the radius 42 of the sphere 32 by finding the point in the collection of points 34 that is farthest away from the center 36. The distance between this point (here, point 40b) and the center 36 is taken 68 as the radius 42 of the sphere 32. The sphere 32 does not necessarily include a point in the collection of points 34 that lies both on the edge of the box 30 and on the edge of the sphere 32 as shown in FIG. 2.

Figure 4:
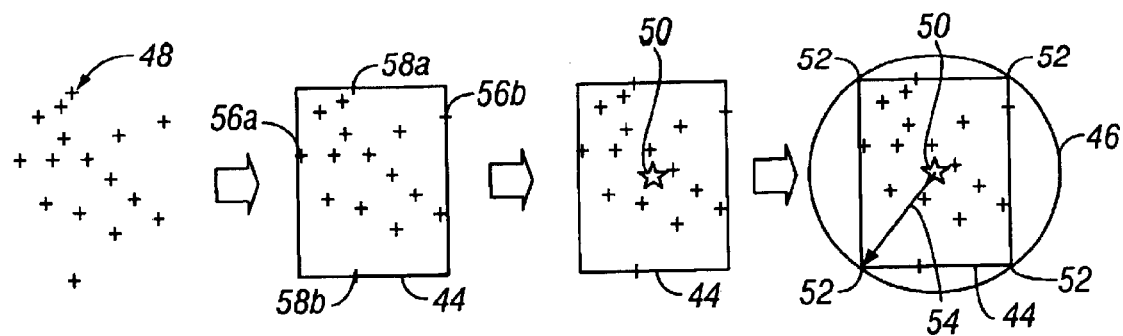
FIG. 4 is a diagram of a method of calculating a bounding shape in accordance with an implementation of the invention.
Figure 5:
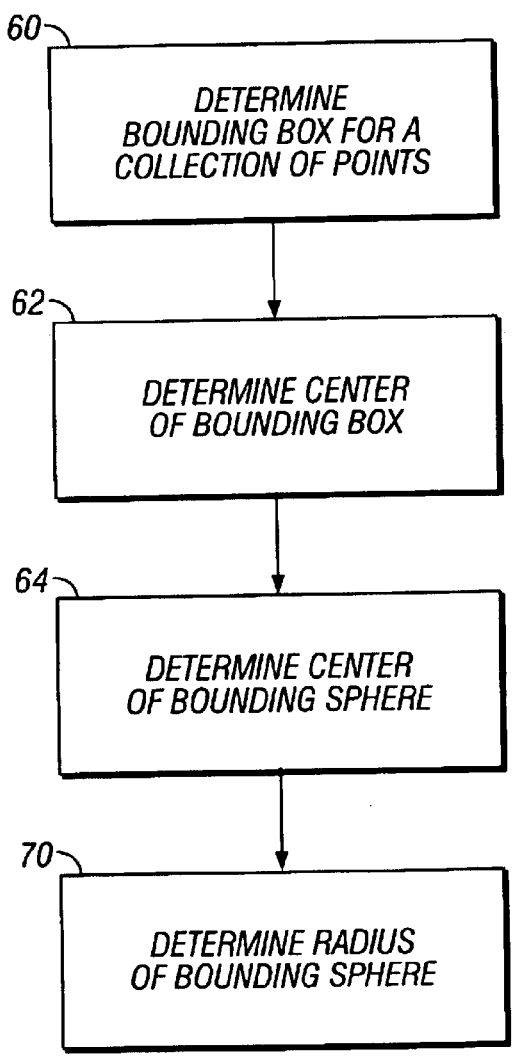
FIG. 5 is a block diagram showing a method of calculating a bounding shape in accordance with an implementation of the invention.

In another specific example of the invention, shown in FIGS. 4 and 5, a method computes a bounding box 44 as the basis for a bounding sphere 46 for a collection of points 48. Once the box 44 and a center 50 have been determined 60–64 (as described above), the method determines 70 a radius 54 of the sphere 46 based on the dimensions of the box 44. The distance between any corner 52 of the box 44 and the center 36 defines the radius 54 of the sphere 46.

Figure 1:
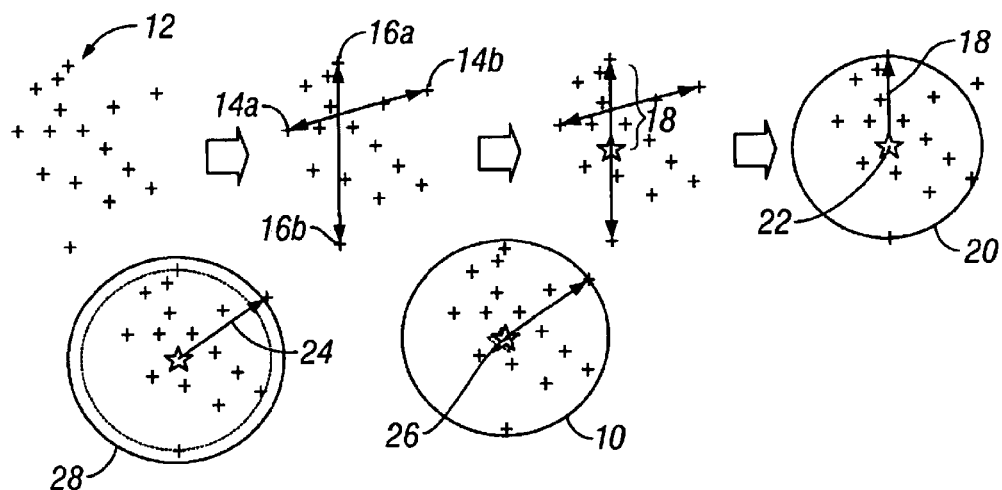
FIG. 1 (PRIOR ART) is a diagram of a method of calculating a bounding sphere.

The methods in FIGS. 3 and 5 (the new methods) both use fewer operations (and thus less processing time) for calculating the bounding spheres 32 and 46 than other methods, e.g., the Ritter method in FIG. 1. In addition, in many cases, the new methods provide tighter (smaller) bounding spheres than the Ritter method. The new methods also produce the same bounding sphere independent of the ordering of points in the collection, whereas the other methods do not.

In comparing the new methods, the method in FIG. 3 usually provides tighter bounding spheres than the method in FIG. 5. The final bounding shape in FIG. 4 encloses the preliminary bounding shape, whereas in FIG. 2 it does not, yet it still encloses all points in the collection. Points in the collection of points usually do not fall on the corners of the bounding box, but elsewhere on the perimeter of the box, so the radius of spheres using the method in FIG. 3 will be smaller than the radiuses found using the method in FIG. 5. However, the method in FIG. 5 requires fewer operations (and thus less processing time) for calculating the bounding sphere than the method in FIG. 3.

Figure 6:
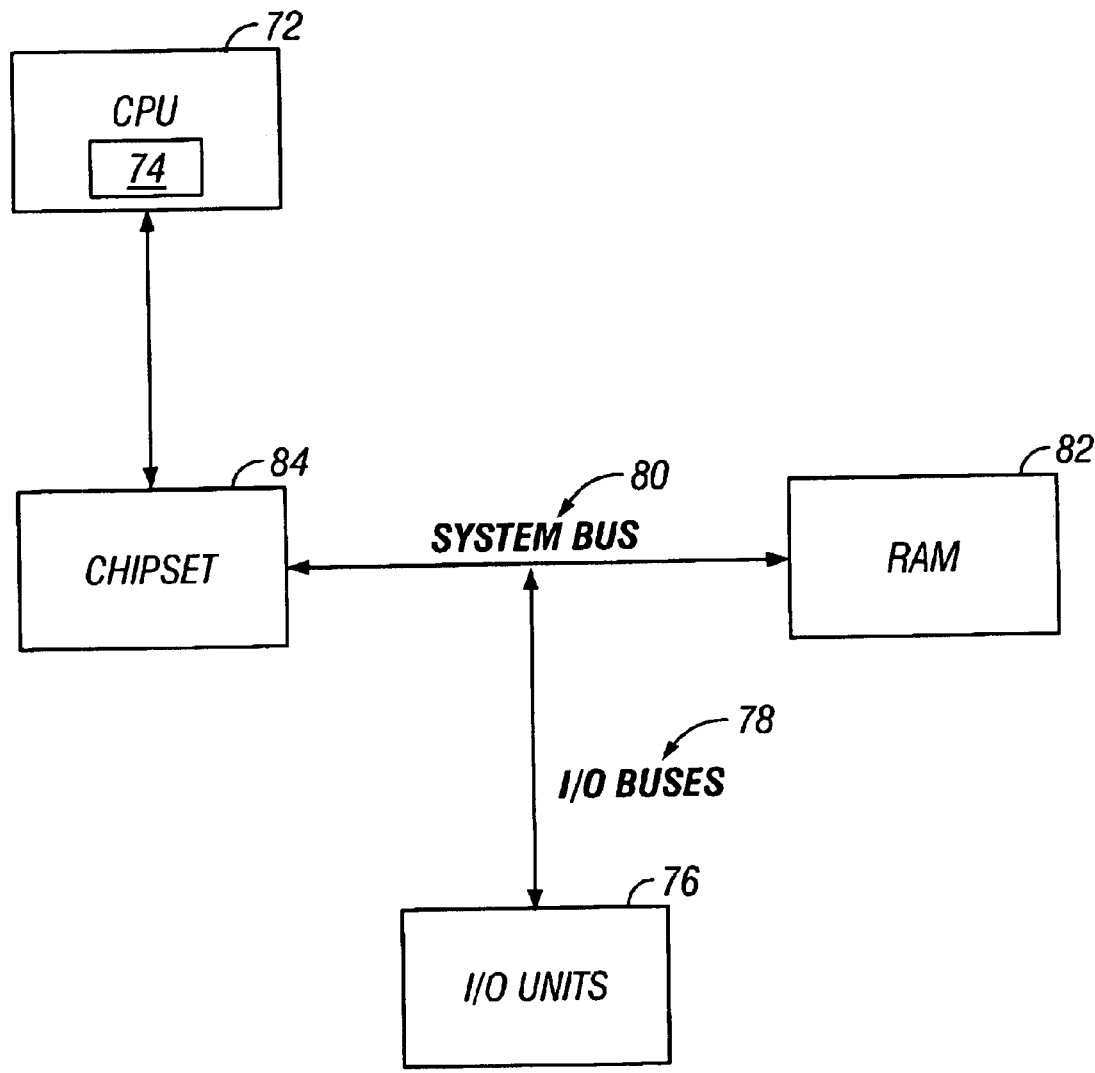
FIG. 6 is a block diagram of a computer system.

As seen in FIG. 6, a storage medium associated with a central processing unit (CPU) 72 can store a machine-readable program 74 capable of executing the methods illustrated in FIGS. 3 and 5. Graphics may be stored on an input/output (I/O) unit 76, e.g., a disk drive. Buses, e.g., I/O buses 78 and system bus 80, may carry these graphics to memory, e.g., RAM 82 using a chipset 84.

Other embodiments are within the scope of the following claims.

What is claimed is:

1. A method of determining a multi-dimensional bounding sphere for a collection of points, comprising:
   determining a multi-dimensional rectilinear bounding box that encompasses all of the points;
   determining the center of the bounding sphere from the center of the bounding box; and
   determining the radius of the bounding sphere as the distance from the center of the bounding sphere to a location not closer to the center of the bounding sphere than any of the points in the collection of points.

2. The method of claim 1 in which the location is the location of the one of the points that is most distant from the center of the bounding sphere.

3. The method of claim 1 in which the location is a corner of the bounding box.

4. The method of claim 1 in which the center of the bounding sphere is determined to be at the center of the bounding box.

5. The method of claim 1 in which the bounding box is a two-dimensional or three-dimensional rectilinear shape.

6. The method of claim 1 in which the bounding sphere is a two-dimensional circle or a three-dimensional sphere.

7. The method of claim 1 in which determining the bounding box includes determining the points that have the minimum and maximum positions in each dimension.

8. The method of claim 1, further comprising selectively engaging in display output processing based upon the determined bounding sphere.

9. An article comprising a computer-readable medium for storing computer-executable instructions for determining a multi-dimensional bounding sphere for a collection of points, the instructions causing a computer to:
   determine a multi-dimensional rectilinear bounding box that encompasses a collection of points;
   determine the center of the bounding sphere from the center of the bounding box; and
   determine the radius of the bounding sphere as the distance from the center of the bounding sphere to a location not closer to the center of the bounding sphere than any of the points in the collection of points.

10. The article of claim 9 in which the location is the location of the one of the points that is most distant from the center of the bounding sphere.

11. The article of claim 9 in which the location is a corner of the bounding box.

12. The article of claim 9 in which the center of the bounding sphere is determined to be at the center of the bounding box.

13. The article of claim 9 in which the bounding box is a two-dimensional or three-dimensional rectilinear shape.

14. The article of claim 9 in which the bounding sphere is a two-dimensional circle or a three-dimensional sphere.

15. The article of claim 9 in which determining the bounding box includes determining the points that have the minimum and maximum positions in each dimension.

16. The article of claim 9, wherein the instructions further cause a computer to selectively engage in display output processing based upon the determined bounding sphere.

17. An apparatus for determining a three-dimensional bounding sphere for a collection of points, comprising:
   a storage unit to store the collection of points; and
   a processor configured to determine a three-dimensional rectilinear bounding box that encompasses all of the points, to determine the center of the bounding sphere from the center of the bounding box, and to determine the radius of the bounding sphere as the distance from the center of the bounding sphere to a location not closer to the center of the bounding sphere than any of the points in the collection of points.

18. The apparatus of claim 17 in which the location is the location of the one of the points that is most distant from the center of the bounding sphere.

19. The apparatus of claim 17 in which the location is a corner of the bounding box.

20. The apparatus of claim 17 in which the center of the bounding sphere is determined to be at the center of the bounding box.

21. The apparatus of claim 17 in which the bounding box is a two-dimensional or three-dimensional rectilinear shape.

22. The apparatus of claim 17 in which determining the bounding box includes determining the points that have the minimum and maximum positions in each dimension.

23. The apparatus of claim 17, wherein the processor is further configured to selectively engage in display output processing based upon the determined bounding sphere.

24. A method of determining a bounding sphere for a collection of points, comprising:
   determining a rectilinear bounding box that encompasses all, of the points;
   determining a center of the bounding box;
   determining the one of the points that is farthest away from the center; and
   determining a radius of the bounding sphere as the distance from the center to the one of the points that is farthest away from the center.

25. The method of claim 24, further comprising selectively engaging in display output processing based upon the determined bounding sphere.

26. A method of determining a bounding sphere for a collection of points, comprising:
   determining a rectilinear bounding box that encompasses all of the points;
   determining a center of the bounding box; and
   determining a radius of the bounding sphere as the distance from the center to a corner of the bounding box.

27. The method of claim 26 in which the bounding box is a two-dimensional or three-dimensional rectilinear shape.

28. The method of claim 26 in which the bounding sphere is a two-dimensional circle or a three-dimensional sphere.

29. The method of claim 26 in which determining the bounding box includes determining the points that have the minimum and maximum positions in each dimension.

30. The method of claim 26, further comprising selectively engaging in display output processing based upon the determined bounding sphere.

31. An article comprising a machine-readable medium embodying information indicative of instructions that when performed by one or more machines result in operations comprising:
   determining which points from a collection of points have minimum and maximum positions in multiple dimensions;
   determining a center of a bounding sphere from the determined points having the minimum and maximum positions in the multiple dimensions;
   determining a radius of the bounding sphere as a distance from the center of the bounding sphere to a location not closer to the center of the bounding sphere than any of the points in the collection of points; and
   selectively engaging in display output processing based upon the determined bounding sphere.

32. The article of claim 31, wherein the determined points comprise six points having the minimum and maximum positions in three dimensions.

33. The article of claim 32, wherein determining the center of the bounding sphere comprises setting the center equal to a center of a rectilinear bounding box defined by the six points.

34. The article of claim 33, wherein determining the radius comprises setting the location equal to a corner of the bounding box defined by the six points.

35. The article of claim 33, wherein determining the radius comprises determining a location of a point from the collection of points that is most distant from the center of the bounding sphere.

36. A method comprising:
   determining which points from a collection of points have minimum and maximum positions in multiple dimensions;
   determining a center of a bounding sphere from the determined points having the minimum and maximum positions in the multiple dimensions;
   determining a radius of the bounding sphere as a distance from the center of the bounding sphere to a location not closer to the center of the bounding sphere than any of the points in the collection of points; and
   selectively engaging in display output processing based upon the determined bounding sphere.

37. The method of claim 36, wherein the determined points comprise six points having the minimum and maximum positions in three dimensions.

38. The method of claim 37, wherein determining the center of the bounding sphere comprises setting the center equal to a center of a rectilinear bounding box defined by the six points.

39. The-method of claim 38, wherein determining the radius comprises setting the location equal to a corner of the bounding box defined by the six points.

40. The method of claim 38, wherein determining the radius comprises determining a location of a point from the collection of points that is most distant from the center of the bounding sphere.

* * * * *